US008473350B1

(12) United States Patent
Bouret et al.

(10) Patent No.: US 8,473,350 B1
(45) Date of Patent: Jun. 25, 2013

(54) APPARATUS, METHODS AND SYSTEMS FOR AD-HOC APPLICATIONS BASED ON ADVERTISEMENT

(75) Inventors: Christopher Bouret, Helsinki (FI); Mikko Lönnfors, Helsinki (FI); Jari P. Kinnunen, Helsinki (FI); Remeres Jacobs, Helsinki (FI); Pekka A. Kuismanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1784 days.

(21) Appl. No.: 11/096,188

(22) Filed: Mar. 31, 2005

(51) Int. Cl.
  *G06Q 30/00* (2012.01)
  *G06F 15/167* (2006.01)
(52) U.S. Cl.
  USPC .................. 705/14.66; 705/14.69; 709/217
(58) Field of Classification Search
  USPC ... 705/1–28, 14.66; 709/217; 726/1; 434/307
  See application file for complete search history.

(56) References Cited

U.S. PATENT DOCUMENTS

| 5,664,948 | A * | 9/1997 | Dimitriadis et al. ...... 434/307 R |
| 6,704,773 | B1 | 3/2004 | Cohn et al. |
| 2002/0095333 | A1 * | 7/2002 | Jokinen et al. .................. 705/14 |

FOREIGN PATENT DOCUMENTS

| EP | 1309152 A2 | 5/2003 |
| EP | 1458132 A2 | 9/2004 |
| WO | WO 03/065219 A1 | 8/2003 |

* cited by examiner

*Primary Examiner* — Sun Li
(74) *Attorney, Agent, or Firm* — Ditthavong Mori & Steiner P.C.

(57) ABSTRACT

The disclosure details the implementation of apparatuses, methods and systems for a Framework for Ad-hoc Applications Based on Advertising (FAABA). The FAABA may employ short-range radio-frequency communications. The disclosure teaches mechanisms for providing targeted advertising in connection with ad-hoc applications/point-to-point (P2P) communications between user terminals. In a manner, the invention teaches general collection components for user terminals, which is responsible for collecting and maintaining a dynamic set of advertisements as a background operation. This allows the user terminals to initiate applications that are based on P2P communication, and furthermore, allows collections of pre-loaded advertisements to be provided to the user terminals along and/or during the P2P communications. Also, the FAABA teaches that after advertisements are stored in the receiving device, the advertisements can be tailored more closely to the interests of the user of the device and the advertisements can be filtered based on current context of the user.

38 Claims, 5 Drawing Sheets

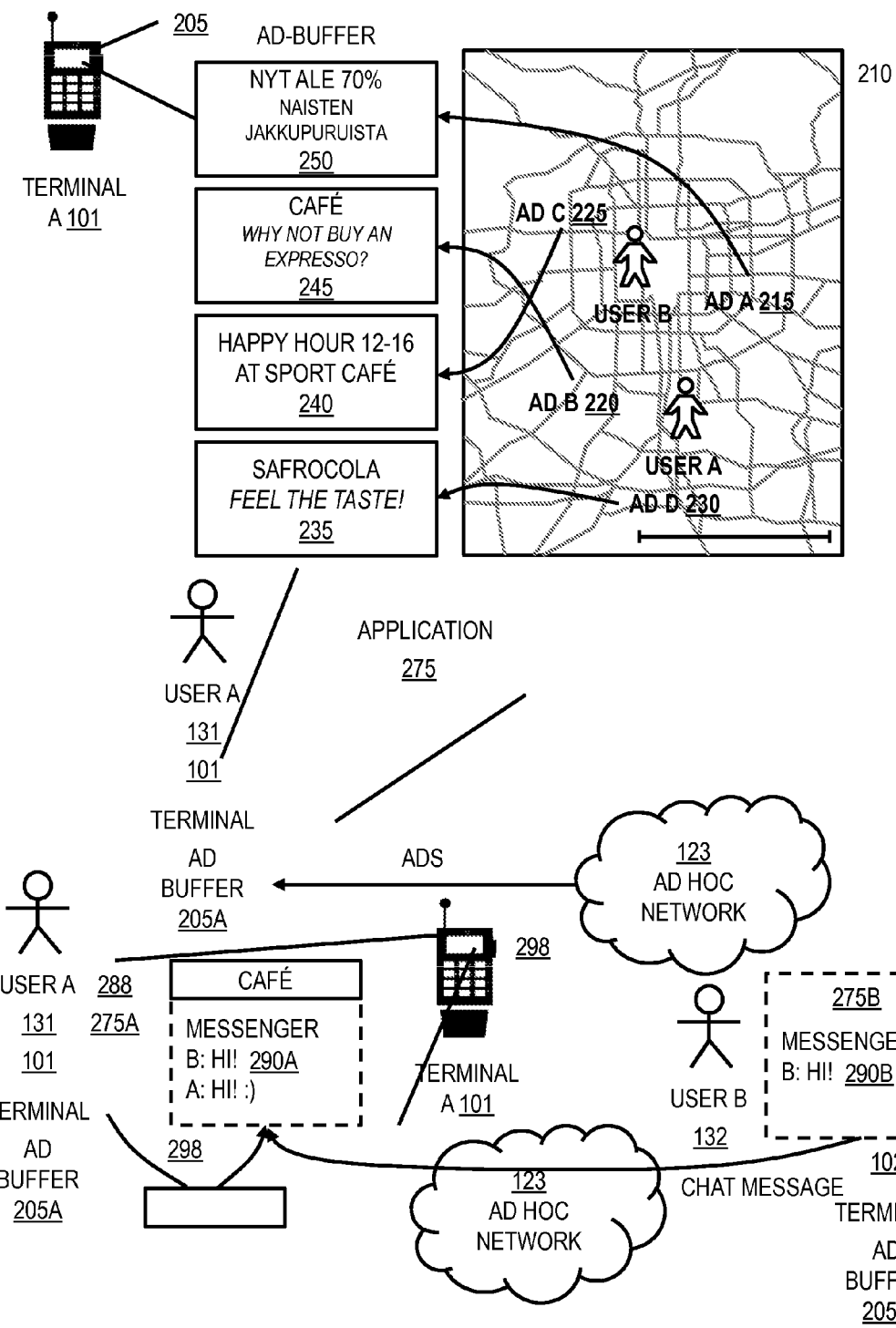

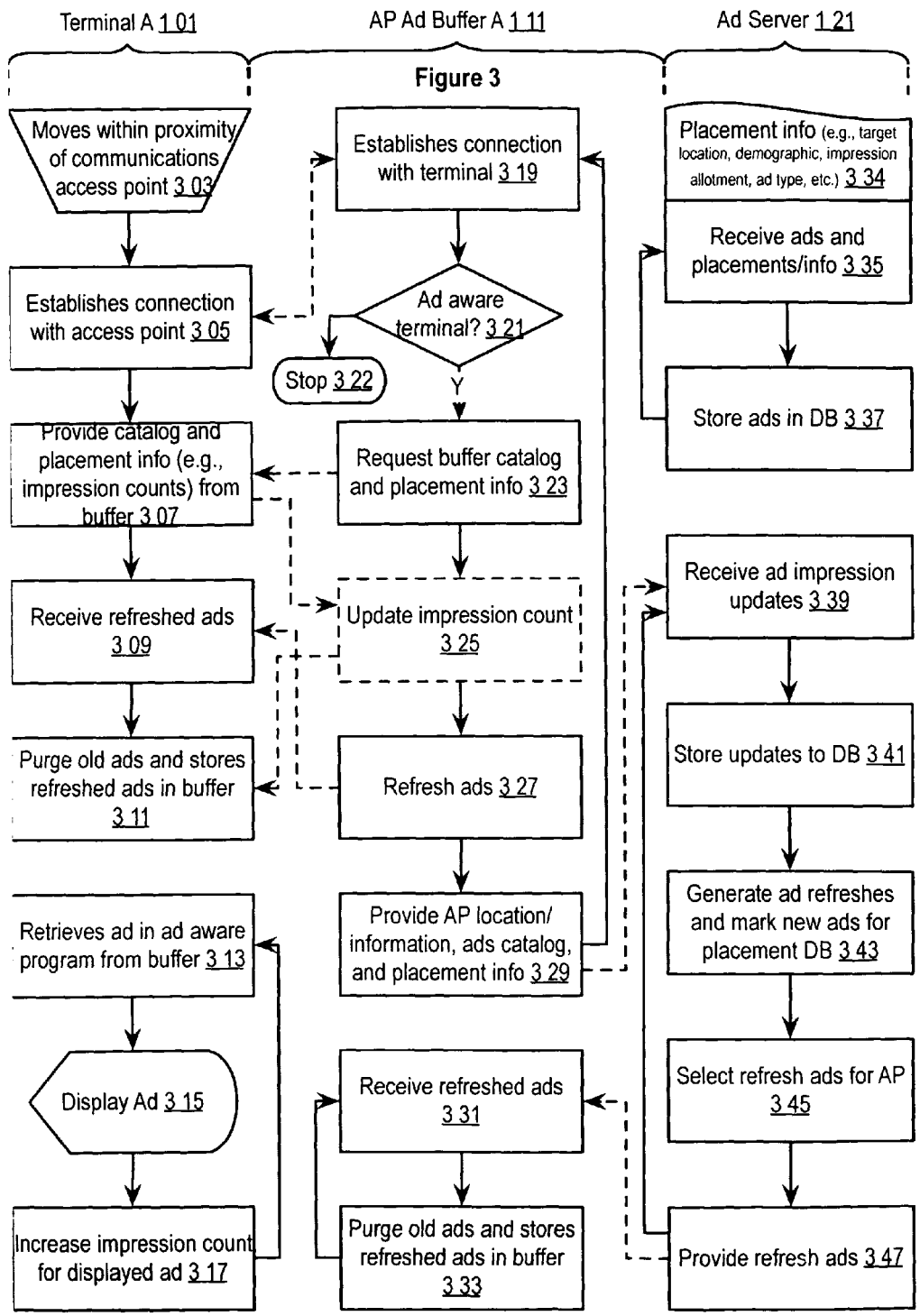

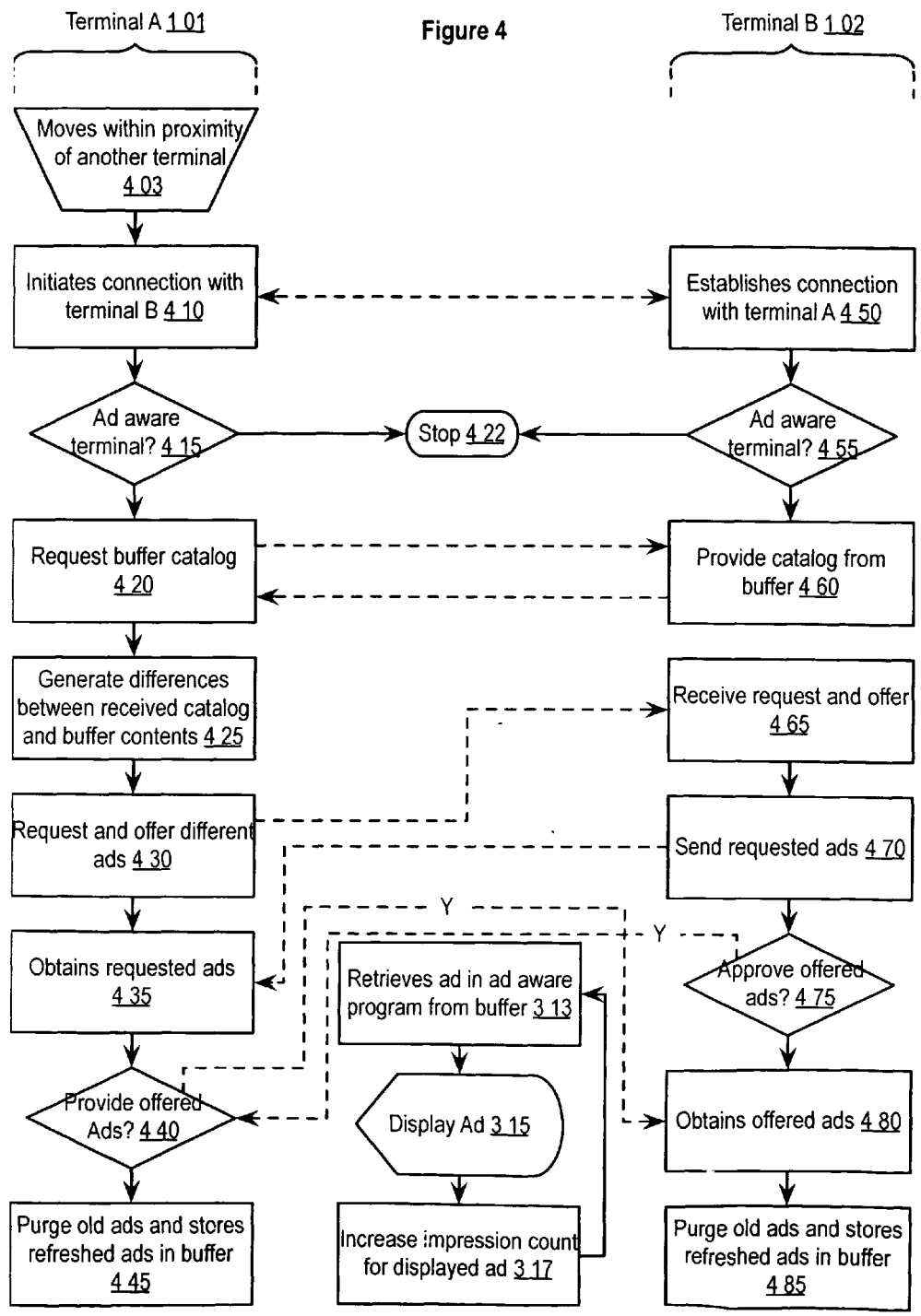

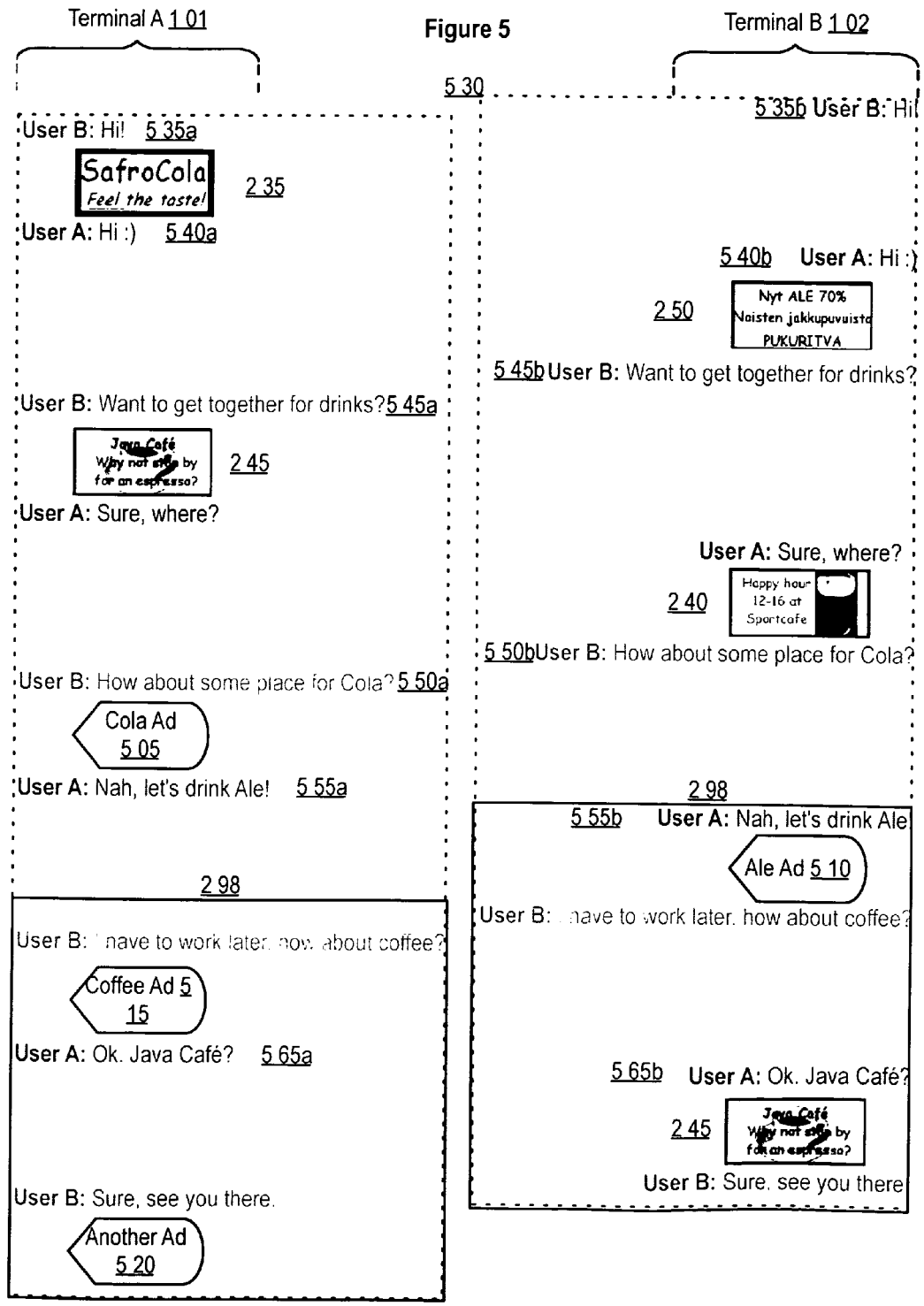

APPARATUS, METHODS AND SYSTEMS FOR AD-HOC APPLICATIONS BASED ON ADVERTISEMENT

FIELD

The present invention relates generally to an apparatus, method and system to distribute information across a wireless communications network. More particularly, the disclosed invention relates to an apparatus, method and system to distribute information across wireless ad-hoc networks among transient and mobile peer devices.

BACKGROUND

Peer-to-Peer Communications (P2P)

People frequently use peer-to-peer (P2P) applications on personal computers to facilitate the distribution of information and computing resources. A basic P2P solution provides each client, e.g., a personal computer, on a network with both a server and client application that allows each user to respectively make available and access resources (e.g., files, CPU time, memory, etc.) with other users. As such each combined client and server node on a P2P network is referred to as a peer. Examples such as Kazaa, Gnuetella, Morpheus, and Napster networks evince the public's desire to share files in a distributed fashion.

Network

Networks are commonly thought to consist of the interconnection and interoperation of clients, servers, and intermediary nodes in a graph topology. It should be noted that the term "server" as used herein refers generally to a computer, other device, software, and/or combination thereof that processes and responds to the requests of clients, often from across a communications network. The term "client," in turn, generally refers to a computer, other device, software, user, and/or combination thereof that generates requests for service. Generally, the term "client" and "user" are interchangeable, and are used as such throughout. As such, servers serve their information to requesting clients. A computer, other device, software, or combination thereof that facilitates, processes information and requests, and/or furthers the passage of information from a source user to a destination user is commonly referred to as a "node." Networks are generally thought to facilitate the transfer of information from source points to destinations.

SUMMARY

Although P2P protocols have been used as delivery mechanisms for sharing files, they have not been tailored to act as a delivery system for mobile devices. Currently P2P nodes address one another logically by using TCP/IP addresses. Such networks have no sense of geographic location, and do not account for in transit devices that frequently are disconnected from any globally addressable and accessible network. No solutions exist where advertisements are preloaded for allowing advertising content to be provided during communication between ad-hoc/P2P network nodes. As such, the present disclosure teaches a P2P system that employs transient mobile devices as a delivery target and carrier for content interchange, i.e., in particular for advertising. Further, transmission bandwidth is saved as no advertisements are transmitted over the air when performing P2P communication with a nearby device.

In one embodiment of the present invention, a method is taught to distribute content during point-to-point communications. The method includes receiving advertisements on a mobile device from encountered communication sources and storing the advertisements in an advertisement buffer on the mobile device. The method also includes receiving an additional communication from a nearby mobile device and displaying advertisements along with the communication on from the advertisement buffer based on advertising placement information on the mobile device.

In another embodiment, a system is taught to distribute content during point-to-point communications. The system includes means to receive advertisements on a device from encountered communication sources and means to store the advertisements in an advertisement buffer on the device. The system also includes means to receive a communication from another device, means to display the received communication, means to retrieve an advertisement from the advertisement buffer on the device, and means to display the advertisement.

BRIEF DESCRIPTION OF THE DRAWINGS

The accompanying drawings illustrate various non-limiting, exemplary, inventive aspects in accordance with the present disclosure:

FIG. 2 is of a data flow diagram illustrating embodiments of an application information distribution with an ad-buffer;

FIG. 3 is of a mixed data and logic flow diagram illustrating embodiments of an FAABA information distribution between a content server, an access point and user terminals;

FIG. 4 is of a mixed data and logic flow diagram illustrating embodiments of an FAABA information distribution between two user terminals.

FIG. 5 illustrates embodiments of advertising display during FAABA communications.

Figure 1:
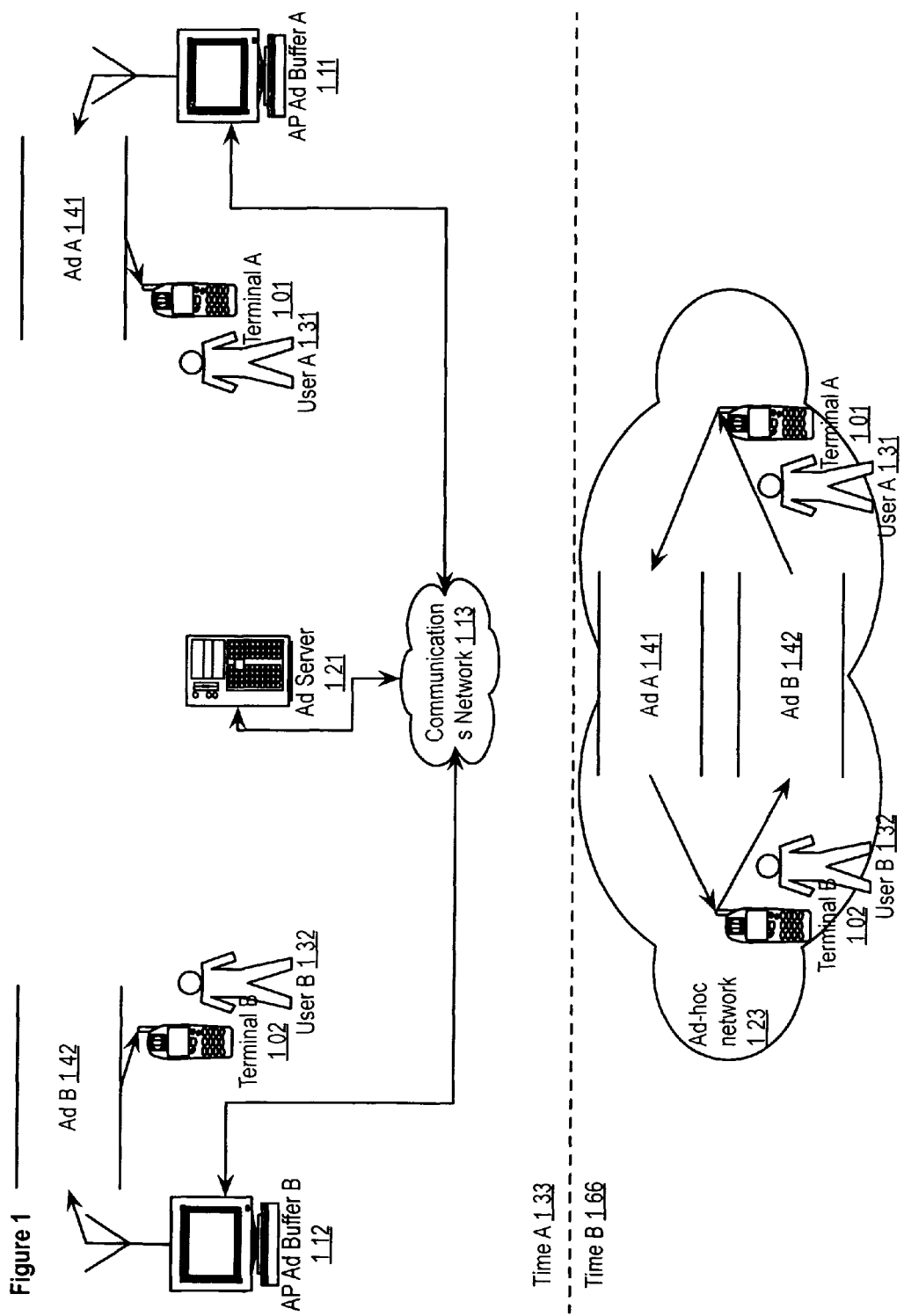
FIG. 1 is of a mixed data and logic flow diagram illustrating embodiments of a Framework for Ad-hoc Applications Based on Advertising (FAABA) topology.

The leading number of each reference number within the drawings indicates the first figure in which that reference number is introduced. As such, reference number 101 is first introduced in FIG. 1; i.e., reference number 201 is first introduced in FIG. 2, etc. Also, it should be noted that dashed boxes in the figures are indicative of optional embodiments. Solid lines indicate logic flow, while dashed arrows indicate data flow.

DETAILED DESCRIPTION

A Framework for Ad-hoc Applications Based on Advertising (FAABA) is taught by showing topologies (FIG. 1), an application in an example topology (FIG. 2), logic for initial distribution of content (FIG. 3), and logic for distribution as between peers (FIG. 4). The FAABA provides a system that allows for dynamic distribution of content across loosely connected, transient and mobile peer devices. While the FAABA is generally discussed throughout this disclosure in the context of distributing advertising, it should be noted that almost any kind of content and/or information may be distributed by employing the FAABA; for example, in one embodiment the FAABA may be used as a P2P file sharing network. In a manner, the invention teaches general collection components for user terminals, which is responsible for collecting and maintaining a dynamic set of advertisements as a background operation. In one embodiment, the collection component may be installed to the mobile terminal during initial software installation within the manufacturing process, or it may be installed to the terminal as operator software when a user of the mobile terminal subscribes to operator services or even later on as freely distributable software. In another embodiment, the component is embedded within ROM and made part of the terminal hardware. In another embodiment, such "ad aware" components are distributed freely in the form of software.

Framework for Ad-Hoc Applications Based on Advertising

FIG. 1 is of a data flow diagram illustrating embodiments of information distribution in a FAABA topology. Generally, data flows between three actors: user 131, 132 terminals 101, 102, access points 111, 112, and content servers 121. Users are generally, but not necessarily, human beings. In some contexts, users may be seen as vehicles and/or other systems. For example, an automobile may be a carrier for terminals. Terminals are devices capable of processing information (e.g., having a computing processor) and capable of forming and engaging in communications in ad-hoc networks. Examples of terminals may include: laptops, personal digital assistants (PDAs), wireless telephones, and/or the like. Such devices may employ any number of communication network interfaces; examples may include: Bluetooth (BT), cellular (e.g., base station controller to base transceiver station (BTSM), code division multiple access (CDMA), (enhanced) general packet radio service ((E)GPRS), global system for mobile telecommunications (GSM)), satellite, WiFi, Ultra Wideband (UWB) and/or the like. The terminals have memory and are capable of supporting applications and provide an operating system environment allowing for the execution of such applications. In one embodiment, a Java runtime is provided, which allows for the deployment of varied applications on the terminal device. One example of a terminal device is the Nokia® 9500 Communicator, which is capable of engaging BT, cellular and WiFi communications. Typically, users carry and employ terminals for purposes of executing applications and communicating. Access points (AP) 111, 112 typically act as communications gateways across communications networks 113 such as the Internet. Examples of APs include BT and WiFi hotspots. The APs include buffer memories to store ads that are provided by an ad server 121. In one embodiment, an AP is comprised of a personal computer running the Linux operating system having a network interface, e.g., 802.11g, with a RAM and hard disk storage space allowing which may be used as a buffer. The ad server 121 may be connected to a communications network and is disposed in communications with the APs. According to non-limiting embodiments of the present invention, the ad server may operated by a phone manufacturer, a cellular network operator, or by a third party, wishing to derive revenue by placing ads on the behalf of advertisers. Such operators may charge advertisers flat rates, a charge per viewed impression, and/or the like. The ad server may have an ad server database with tables regarding the various APs by providing each AP with a unique identifier, e.g., its IP address. Further, the ad server may have various tables describing ads, ad use, advertiser client information, user terminals and/or the like.

The upper portion of FIG. 1 shows users A 131 and B 132 at an initial time A 133. Each user A and B, respectively, carries a terminal device 101, 102, e.g., a BT enabled cell phone, and passes by an AP 111, 112. As user A's 131 terminal A 101 passes by AP A 111, terminal A 101 engages in communications with AP A 111. Upon establishing communications, AP A provides advertisement A 141 to terminal A 101, which is stored on the device as a background operation and may be viewed by user A 131 upon user request. Similarly, as user B's 132 terminal B 102 passes by AP B 112, terminal B 102 engages in communications with AP B 112.

Upon establishing communications, AP B provides advertisement B 142 to terminal B 101 as a background operation, which is stored on the device and may be viewed by user B 132 upon user request. At time A 133, terminal A an B are too far apart to be in direct communications with one another. As such, terminal A will now have ad A and terminal B will now have ad B stored in its memory.

The lower portion of FIG. 1 shows users A 131 and B 132 forming an ad-hoc network 123 at a subsequent time B 166, e.g., a BT pico-net. As users A 131 and B 132 approach and pass each other, their terminal devices 101, 102 may establish a connection with one another forming the ad-hoc network 123. As the users pass by one another, ad A 141, which is stored on terminal A 101, is sent to terminal B 102 as a background operation. Similarly, ad B 142, which is stored on terminal B 102, is sent to terminal A 101 as a background operation. As such, both terminals A 101 and B 102 both store ads A 141 and B 142.

According to embodiments of the present invention, the terminal devices 101, 102 may conduct in a wireless communication session by way of starting a peer-to-peer communication application as the users pass by one another. During the communication session, when messages are communicated between the devices, the stored ads A 141 and B 142 may be included in the received message by either or both of the terminal devices 101, 102 so that the ads A 141 and/or B 142 received as background operation will be displayed along with the peer-to-peer communication if certain criterion for displaying either or both of the ads A 141, B 142 is met, as will be described more fully below.

FAABA Applications

FIG. 2 is of a data flow diagram illustrating embodiments of an application information distribution with an ad-buffer. As mentioned in FIG. 1, an ad-buffer 205 is memory space allocated for the storage of ads on a terminal device 101 and access point 111. As long as the terminal and AP have a accessible memory (e.g., (flash) RAM, hard disk space, etc.) and a programmable processor (e.g., an ARM processor with a Java runtime), then space may be allocated for the storage of a multitude of information types, including ads. In one embodiment, ads are provided in audio (e.g., .WAV, .MP3, .AAC, etc.), text (ASCII, HTML, XML, Unicode, etc.), graphic (e.g., .JPG, .GIF, .TIF, .PDF, etc.), multimedia (e.g., Flash), video (e.g., .AVI, .MPEG, .MOV, etc.), and/or the like formats. The ads may be transported employing to and from the terminals and APs by employing HyperText Transport Protocol (HTTP) POST commands. The HTTP commands may be layered and employed over any underlying low level transport protocol (e.g., BT, cellular, satieties), for example, by employing TCP/IP over the lower-level communications.

As such, FIG. 2 illustrates an example of a user 101 that is moving about a geographical region as depicted by the map 210. As the user moves about the region from points A 215, B 220, C 225 and D 230, the user passes by various access points and other ad-aware terminals and thereby collecting four advertisements; i.e., in this example one from each location. In this case, the user first received an ad for NYT Ale 250 at location A, espresso 245 at location B, happy hour 240 at location C, and SafroCola at location D. Each of these ads were stored into the ad-buffer 205 of user A's 131 terminal device 101. Each of the locations represents terminal A 101 making an ad-hoc network 123 across which it received ads into its ad buffer 205a.

The terminal 101 may be used for any number of applications 275. Example applications may include: instant messaging, social network messaging, mail, Web surfing and/or the like. The terminal's 101 memory may be loaded with such applications as desired by the user 131. In one embodiment, such applications include a portion of the display to show ad-banners, e.g., similar to how the ad-based version of the Opera Web browser provides an advertising banner. In another embodiment, the ad may be appended to incoming content. For example, incoming and out going emails may have ads appended to the end of the message. In yet another embodiment, audio ads may be played upon receipt. Audio ads may also be used as alternative ring-tones.

In yet another embodiment, an instant messenger program 275 (e.g., AOL, Yahoo, etc.) may be used by the user 131 on the terminal device 101. The instant messenger program may also employ an ad-strip 288 into which buffered 205*a* ads 235 are loaded and presented to the user. Ads may be resized to fit within the bounds of the ad-strip 288 as may be required. In such an example, when user A 131 and B 132 come within proximity of one another, their terminals 101, 102 establish an ad-hoc network 123. At that point, user B 132 may choose to execute the terminal B's 102 instant messenger 275*b* and send a message "Hi!" 290*b*. That chat message is sent to user A's terminal A 101 where it is displayed 290*a* by terminal A's instant messenger 275*a* on the terminal's display 298. Here, the instant messenger 275*a* has an integrated ad-strip 288 where it loads in an ad 245 from terminal A's ad buffer 205*a*, which in this example was cached in the buffer at location B 220 earlier in the day. Similarly, if user B's instant messenger 275*b* were enabled with an ad strip 288, then it could display ads collected from its own ad buffer 205*b*.

FAABA Terminal-AP Ad Transfers

FIG. 3 is of a mixed data and logic flow diagram illustrating embodiments of an FAABA information distribution between a content server 121, an access point 111 and user terminals 101, i.e., terminal-AP ad transfers. When a user moves their terminal 101 within proximity 303 of an access point 111, the terminal will begin establishing a connection with the detected access point 305. Regardless of the transport mechanism (e.g., cellular, BT, WiFi, etc.), often, both terminals and access points (e.g., cellular towers, BT APs, WiFi router/APs, etc.) broadcast their availability by employing their respective transport protocols and establish connections employing known connection handshake protocols. As such, an AP 111 may form a communication connection with the proximal terminal 101 by concluding the handshake 319. In an optional embodiment, upon establishing a connection, the terminal and/or AP may store the identifier (e.g., name, handle, address, etc.) of the other device with which it established communications; such identifiers may be stored in the devices' database (as will be discussed in greater detail below). Once the connection is formed 309, 319, the AP may determine if the terminal is ad aware 321. In one embodiment where BT is employed, a service discovery protocol (SDP) may be used to obtain profile(s) stored in memory on the terminals (e.g., generic object exchange profile (GOEP), service discovery application profile (SDAP) compliant profiles, etc.). The profiles may include an entry that identifies that the device with a flag signifying that the device is ad-aware, i.e., that it has components to enable the transfer/interchange of ads between a terminal and either an AP or another terminal. For example, with BT, a BT protocol stack component may include various protocols that enable the file transfer. In another embodiment, TCP/IP may be used as a transport layer where HTTP POST commands can transfer ad files as between terminals and APs. Similarly, technologies such as Apple's Rendezvous may be employed to provide profiles of devices across TCP/IP enabled networks, e.g., across ad-hoc IEEE 802.11 (WiFi) networks. If the terminal 101 is not ad aware, then communications may proceed normally without any further terminal-AP ad transfer activity 322.

If the terminal device is ad aware 321, the AP may request a catalog of ads and ad placement information 323 stored in the terminal's ad buffer. In one embodiment, the ad buffer is comprised of a database and such requests are made by way of a query request, e.g., via SQL commands selecting for all ads on that device.

Moving temporarily from the terminal-AP transfer discussion, it is useful to describe an example of an ad buffer database. An ad buffer database (ABDB) may be embodied in a database and its stored data, wherein the database comprises stored instruction signals, which may be executed by the device's CPU to store and retrieve data; the stored instruction signal portion configuring the CPU to process the stored data. Ideally the database is a conventional, fault tolerant, relational, scalable, secure database such as HanDBase, Oracle (e.g., 8iLite Optimized Object-Relational database), thinkDB, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship. Alternatively and/or in environments where processing power and memory are limited, the Bluetooth directory database may be implemented using various standard data-structures, such as an array, hash, (linked) list, struct, table, and/or the like. Such data-structures may be stored in memory and/or in (structured) files. Portions of databases, e.g., tables, may be exported and/or imported and thus decentralized and/or integrated. In one non-limiting example embodiment, the database module includes tables such as but not limited to a (e.g., Bluetooth): identifier (e.g., a Bluetooth address) table, name (e.g., a cleartext name to represent a Bluetooth enabled device) table, profile(s) (e.g., generic object exchange profile (GOEP), service discovery application profile (SDAP) compliant profiles, etc.) table, ad table (e.g., storing the ads, ad identifier, current impression counts, etc.), ad placement information (e.g., storing ad target location, demographics, impression allotments, ad types, etc.), and/or the like. In one embodiment, the tables may be related by the an ad identifier key field entries as they are unique. In an alternative embodiment, these tables may be decentralized into their own databases and their respective database controllers (i.e., individual database for each of the above tables may exist). By employing standard data processing techniques, one may further distribute the databases over several device systemizations and/or storage devices. Similarly, configurations of the decentralized database controllers may be varied by consolidating and/or distributing the various database modules. The ABDB database may be configured to keep track of other (e.g., Bluetooth enabled) devices that have passed within the range of the terminal as well as user requests, and/or other various transactions. The ABDB may communicate to and/or with other components in a component collection, including itself, the operating system, the file system, and/or facilities of the like. The database may contain, retain, and provide information regarding other terminal devices and ad data. In an alternative embodiment, a Bluetooth identifier field is added to a normal contact database (e.g., such as those found in cellular telephones, PDAs, and/or the like) and linked to the ABDB.

Now moving back to the discussion of terminal-AP transfers, upon generating a request for a catalog of ads in from the terminal's ad buffer and/or ABDB 323, the ad aware terminal 101 will generate a list of ads and current ad placement information (e.g., the number of times each ad has been viewed) from the ad buffer and provide that catalog to the AP 307. The AP may use the obtained catalog 307 to update its own impression counts for the same ads stored on its own ABDB. For example, if the AP 111 determines that the number of ad impressions for a given ad has been exceeded, it may send a message to the terminal to purge such ads from the ad buffer 311. Upon updating its information 311 with obtained terminal placement information 307, the AP may refer the ads stored on the terminal 327. Several heuristics may be used. In one embodiment, all new ads not found on the terminal, but available in the AP's ad buffer are transferred to the terminal 309. In such an embodiment, if there is insufficient memory, the terminal may delete older ads to accommodate the newer ads. In another embodiment, the terminal's profile information is analyzed for location, demographic factors, and/or the like, and the AP selects ads for refreshing based on such factors 327. Such analysis may be achieved by parsing the terminal's profile and generating an SQL query based on token keywords from the terminal's profile which act to select ads in the AP's ABDB, i.e., ad buffer.

This AP-terminal transfer facility 327 may then update a content server 121 with regard to the updated ad usage/placement information obtained 307 by the AP 329. The AP may provide its own profile information (e.g., location, AP identifier, etc.), its current catalog of ads in its ad buffer (e.g., by selecting all ads in its ABDB), and its updated 325 placement information, and send all such information to the ad server 121, 339. Thereafter, the AP-terminal transfer facility 329 may iterate 319 as other terminals come within its proximity. It should be noted that the above embodiments show that the AP determines if a terminal is ad aware 321, but, alternatively, the terminal may similarly determine if an AP is ad aware and take on the processing requirements for evaluating and requesting the refreshing 327 of ads; such an embodiment has the benefits of distributing the processing load to a greater number of terminals.

The content server 121 may obtain updated ad placement information (e.g., updated add impressions) 339 from an AP 111. In one embodiment, the AP may provide such updates when it culls updated information 325 from terminals 111 as already discussed 329. Also, the ad server 121 may periodically poll APs to provide 329 their current ad buffer catalog and placement information. In one embodiment, the ad server may specify a an iteration period in which updates 339 and ad refreshing are provided; for example, such updates may be periodically instantiated with a Unix cron job. Upon obtaining the updates 339, the ad server 121 may store the updated information into its own ABDB 341. With the updates stored in the ABDB 341, the ad server may query itself to generate a list of new ads for a given AP. For example, upon updating the ABDB 341, certain ads may have experienced more impressions than paid for by advertisers. In instances where the ads are no longer viable, either because the time period in which they should run is no longer valid or the impression count has been exceeded, such expired ads will not be identified as refresh candidates when the ad server generates a new set of ads 343. This may be achieved by selecting ads keyed upon a given AP's profile. The AP profile may have demographic, geographic, and/or other identifying information which may be used as the basis of a an SQL query of the ad server's ABDB. Further, such a query would also be limited to non-expired ads. Upon supplying such a search query to the ABDB, it will return a list of candidate ads for refreshing 343. In many instances, the returned number of candidate ads may exceed the capacity of the AP ad buffer, and as such, several heuristics may be employed for selecting the ads with which to refresh the AP ad buffer 345. In one embodiment, the results with the highest matching index rankings are selected. In another embodiment, the matches where advertisers paid the greatest amount for ad placement may be selected. Such selections are cut-off to fit within the ad buffer space of the AP. The ad buffer space may discerned from its provided 329 profile. Upon selecting the refresh ads 345, they are provided 347 to the AP, which receives them 331 and stores them in its ad buffer 333. The AP may purge older ads in its ad buffer in a manner similar to the purging of the ad buffer as already discussed with regard to the terminal 311. The AP may separately iterate this receive 331 and refresh 333 operation on demand 347, periodically, and/or continuously. Similarly, the ad server 121 may independently iterate the receiving 335 of ads and placement information (e.g., desired target locations, demographics, impression allotment, price paid per impression, ad type, advertiser identifier, etc.) 334 and storage of such information within its own ABDB 337.

In yet another independently iterating component, terminal A 101 will retrieve an ad from the ad buffer when accessing an ad aware program on the terminal 313. An example ad aware application, an instant messenger 275a, was already discussed in FIG. 2. For a program to be ad aware, it need only access the contents of the ad buffer 205 and display ads 315. For example, the ad aware application may display ads in an ad strip 288 of FIG. 2. Upon displaying the ad 315, the impression count for the ad is increased by one and record of it is stored in the ABDB 317.

Furthermore, the heuristics for selecting 313 which ad to display 315 may vary. In most circumstances, ads that have been displayed beyond an allotted impression count (if known) or outside of a specified location or time frame will not be selected for display. As impression counts increase, or as the terminal's internal time monitor or positioning sensors (e.g., GPS) change, the terminal 101 may compare an ad's placement information 334 against such dynamically varying circumstances to act as a filter for selecting candidate ads for display 315. For example, various cell phones have the ability to discern their location relative to cell towers and can provide GPS coordinates. Alternatively, should a user find themselves proximate to an access point, or in communication with another terminal that is proximate to an access point, a geographic position may be discerned based on the access points location. An example of this is when a user enters a retail outlet that offers WiFi connectivity, and their WiFi enabled device establishes a connection at that location. As such, as part of the placement information, filtering queries may be provided. An example of such filtering would be an ad received for a coffee shop 235 that would include filtering that requests that the ad is only displayed if a user 131 is within half a mile of the coffee shop's physical location. In such an example, the filter may include an XML tag delineated request providing the GPS coordinates of the coffee shot (e.g., longitude/latitude) and a deviation amount of half a mile. Although such an ad may have been transferred to terminal A 101 many miles away from the coffee shop location 220 by another terminal, it becomes displayed 288 when the user 131 walks within a half mile of the shops location 220 (e.g., by performing an arithmetic delta on the terminal's current GPS position and seeing if it overlaps the supplied GPS coordinates of the coffee shop 220). It should be further noted that also other type location information, such as, for example the cell ID of the base station with which mobile terminal is currently communicating could be used to determine the location of the mobile terminal, Similarly, demographic filters may be employed. For example, if a user's terminal device profile includes personal information regarding the user (e.g., age, sex, etc.), then ads may be targeted for exposure based on demographics. For example, if the user is in a convenience store and the user is known to be over 21 years of age, then ads for alcohol may be selected from the ad buffer. In another embodiment, the ads having the highest payments per impression as paid by an advertiser are given the greatest priority. As has already been discussed, such selection may take place by parsing filters/placement information for constituent keyword tokens and generating a query to perform on the terminal's ABDB.

FAABA Ad Transfers Between Terminals

FIG. 4 is of a mixed data and logic flow diagram illustrating embodiments of an FAABA information distribution between two 101 user terminals 102, i.e., terminal ad transfers. When a user moves their terminal 101 within proximity 403 of another terminal 102, the terminals will begin negotiating 410 a connection with on another 450. Regardless of the transport mechanism (e.g., cellular, BT, WiFi, etc.), often, the terminals (e.g., cellular towers, BT APs, WiFi router/APs, etc.) broadcast their availability by employing their respective transport protocols and establish connections employing known connection handshake protocols. In the instance of two peers, often the handshaking involves establishes one peer that acts as a server to the other peer acting as a client. As such, terminal A 101 may form a communication connection with the proximal terminal B 102 by concluding the handshake 450. Once the connection is formed 450, terminal B 102 may determine if terminal A is ad aware 455. In one embodiment where BT is employed, a service discovery protocol (SDP) may be used to obtain profile(s) stored in memory on the terminals (e.g., generic object exchange profile (GOEP), service discovery application profile (SDAP) compliant profiles, etc.). The profiles may include an entry that identifies that the device with a flag signifying that the device is ad-aware, i.e., that it has components to enable the transfer/interchange of ads between terminals. For example, with BT, a BT protocol stack component may include various protocols that enable the file transfer. In another embodiment, TCP/IP may be used as a transport layer where HTTP POST commands can transfer ad files as between terminals. If terminal A 101 is not ad aware, then communications may proceed normally without any further terminal ad transfer activity 422.

If the terminal device is ad aware 455, terminal B may provide a catalog of its ads and ad placement information 460 stored in its ad buffer to terminal A 415. In one embodiment, the ad buffer is comprised of a database (as has already been discussed in greater detail in FIG. 3) and such requests are made by way of a query request, e.g., via SQL commands selecting for all ads on that device. Similarly, terminal A 101 may make a determination of terminal B is ad aware 415. Once terminal A determines that terminal B is ad aware 415, it may make a request to obtain a catalog of ads in terminal B's ad buffer 420. If terminal B 102 has not yet generated a catalog of its ad buffer contents 460, it would do so in response to terminal A's request 420 and provide the catalog back to terminal A 420. Terminal A may then compare the ad contents of terminal B's ad buffer to the ad contents of its own ad buffer and discern the differences in contents 425. In one embodiment, the terminal may use ad identifiers (e.g., unique numbers that identify ads from the ad server database) as a basis for comparison. Upon identifying ads different from its own stored in its ad buffer, terminal A 101 then may generate and provide a request for those different/new ads 430 to terminal B 102, which receives the request 465. In one embodiment, terminal A may also send an offer to supply ads in terminal A's ad buffer that are not in terminal B's ad buffer 102 so that terminal B may be updated as well 465. Terminal B may then provide the ads requested by terminal A 470, e.g., by sending the ads via HTTP POST. Once terminal A obtains the requested ads 435 it may check to see if terminal B wants to accept terminal A's offer for ads 440. Terminal A may continue to wait for a positive or negative response to its offer. In one embodiment, terminal A will continue to wait for a response to its offer 440 until one is obtained. In another embodiment, terminal A will wait for a specified time, and if it does not receive a response to the offer, such a lack of response is interpreted as a declining of the offer. In concert, if terminal B approves of the offered ads 475, it will inform terminal A of such approval (or disapproval, whichever the case). In one embodiment, a terminal will accept all new ads. In an alternative embodiment, a terminal may keep a log of viewed ads, and may decline offered ads if such ads have already expired and been purged from the terminal in the past. After informing terminal A 475 of its 102 approval of the offered ads, terminal A provides those ads 440 and terminal B obtains the offered ads 480, e.g., via HTTP POST transfer. Upon obtaining requested/offered ads 435, 480, the terminals may store the ads in their respective ad buffers and purge older as may be required and as has already been discussed 311 of FIG. 3. Finally, it should be noted that each of the terminals A and B 101, 102 may independently iterating retrieval 313, display 315, and impression counting of ads 317 as has already been discussed in FIG. 3.

FIG. 5 illustrates embodiments of advertising display during FAABA communications. Further to the description of ads 288 being displayed 315 during instant messaging 275 of FIG. 2, FIG. 5 shows a transcript 530 of such a discussion as between Terminal A 101 and Terminal B 102. The two lightly dotted boxes 530 show the transcript of a discussion between two users: User A 131 controlling terminal A 101, and User B 132 controlling terminal B 102. The users are keying in their messages to one another by using an instant messenger program on their terminals, and one can see the discussion develops over time from the top of the figure to the bottom. Each of terminal A 101 and B 102 have accumulated various ads in their respective ad buffers 205, as has already been discussed in connection with FIG. 2. In particular, both users A 131 and B 132 have collected ads A 250, B 245, C 240 and D 235 of FIG. 2 through various interactions; all of which are resident in each of the terminals local ad buffers. Currently, user A is situated at a location between geographic points B 220 and D 230 of FIG. 2, while user B is situated at a location between geographic points A 215 and C 225. The conversation starts with User B saying "Hi," which is first displayed on Terminal B 102, 535b, and then on Terminal A 101, 535a. After terminal receives the message 535a from Terminal B, the ad-aware instant messenger program loads an ad, e.g., for SafroCola 235, from Terminal A's local ad buffer 205 and displays it in an ad strip 288 as part of the on-going communications between users A and B. In this case, the ad-aware software used Terminals A's geographic position that is proximal to geographic location D 230 (e.g., which might be a location that sells SafroCola) as a reason to display an ad relevant to user A's geographic context. Next, user A sends a message 540a back to user B 540b. When Terminal B receives the message 540b from Terminal A, Terminal B's ad-aware instant messenger program, similarly, retrieves an ad, e.g., for ale 250, from its local ad-buffer and displays the ad as part of the messaging. Here, similarly, the ad-aware software used Terminal B's geographic position that is proximal to geographic location A 215 (e.g., which might be a location that sells Ale) as a reason to display an ad relevant to user B's geographic context. Here the terminals may have accessed memory containing the current GPS coordinates and then searched ads in its ad buffer that were tagged with GPS coordinates, and selected ads in the closest proximity to the user. User B may then continue on with the conversation 545b, which would result in User A receiving that message and observing another advertisement relative to the users position, e.g., perhaps for a café 245 near user A's position 220. And this may go back and forth with User B continuing to retrieve ads from its ad-buffer and display ads based on geographic and other contexts 240.

As the conversation progresses 550b, we can see that Terminal A's ad-aware instant messenger is capable of using other contexts as a basis in for retrieving ads (e.g., from its local ad-buffer) and for display 505. Here User B provided a message asking if User A might be interested in "Cola" and Terminal A's ad-aware software searched for ads in its ad-buffer that were tagged with "Cola" and then retrieved a Cola ad 505. As such, the ad-aware software may the text of the communications between users to search for ads having matching terms. Ads having the greatest number of matching terms would then be selected from the ad-buffer and displayed. As the conversation continues 555a, more ads 510 based on communications context 555b are displayed; e.g., User A's suggestion for ale 555b would cause the ad-aware software to retrieve an ale ad 510 from Terminal B's ad-buffer. At this point, we see what the users might see on their screens 298 as what is represented by the solid boxes 298. In this example, rather than having a stationary ad strip 288 that occupies a fixed portion of the terminal's display screen 298, instead, the banner ads are displayed in line 510, 245, 515, 520. As the conversation nears a close 565a, Terminal B may display an ad 245 based on the comments and suggestions received from User A 565b; e.g., User A may have observed an ad 245, 545a during the course of the conversation and suggest it as a place to visit 565b and cause Terminal B to retrieve this ad 245 from its ad-buffer. As the conversation closes or continues other ads 520 may continue to be shown.

Several things should be noted about the example conversation in FIG. 5. First, as ads are displayed, the terminal's ABDB is updated noting when and where the ad was displayed. As the ABDB is updated over time, such ad tracking may eventually be uploaded back to centralized servers that aggregate and track ad use for many terminals, which in turn may be used for setting ad rates. Next, Terminal A and B may be disposed in communication through any number of modes and mediums. In some cases, the terminals may be far apart and each terminal may be communicating through a local access point and the communications may take place over a long distance back bone, e.g., over the Internet. In other cases, the communications may be local short-range connections where the users are disposed in communication over the same access point, e.g., cellular, Wi-Fi, Bluetooth, etc. Also, the nature of the communications may vary depending on the protocol and/or application used by the user; for example, some communications may be direct (e.g., voice communications via cellular towers) while others are peer-to-peer (e.g., instant messaging). Further, it should be noted that even in the cases where communications are over local-short range connections, each terminal may access its own ad-buffer for the retrieval of ads. By each terminal accessing its own ad-buffer for ads, communication bandwidth is saved as the ads are not transmitted during the communication and the ads can be more clearly targeted to the terminal users as the context assessment (e.g., filtering, matching, etc. of location, profiles, etc.) takes place locally on the receiver's terminal. Also, although an instant messaging program was described, many other applications may be made ad-aware; e.g., email, SMS, audio, video, etc. For example, while users converse on their cell phones, the cell phone's display may be used to show ads based on the user's location, conversation (e.g., caller ID of a friend in their address book may suggest a gift because the friend's birthday is coming up soon), profile, etc.

It should be noted that the FAABA's operations discussed in FIGS. 1-5, above, take place as background operations so the user of the mobile terminal does not have to be aware of such operations. In an alternative embodiment, users may be prompted for their approval to display their preference of ads, which may be used to further establish a user profile.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. In describing embodiments of the invention, in some cases specific terminology has been used for the sake of clarity, however, the invention is not intended to be limited to and/or by the specific terms so selected, and it is to be understood that each specific term includes all technical equivalents which operate in a similar manner to accomplish a similar purpose. It should be noted that terms and or phraseology in this disclosure are not exhaustive in detail, and are not provided as definitive definitions. Rather, the terms are provided herein simply as an aid to the reader. The terms are not limiting of the disclosure and/or claims herein. The use of the terms may contemplate any of the broader, and/or multiple meanings found in common use, dictionaries, technical dictionaries, and/or in actual use in the technical arts, as well as any broadening made throughout this disclosure. Also, the advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of space and reducing repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that aspects of the disclosure such as advantages, embodiments, examples, features, functional, logical, organizational, structural, topological, and/or other aspects are not to be considered limitations on the disclosure as defined by the claims or limitations on equivalents to the claims.

What is claimed is:

1. A method, comprising:
receiving advertisements on a mobile client device associated with a first user from encountered access points, wherein the advertisements include related advertisement placement information;
storing the advertisements in an advertisement buffer on the mobile client device associated with the first user;
receiving, at the mobile client device associated with the first user, an additional communication from a nearby mobile client device associated with a second user; and
determining by a processor to display, based on advertisement placement information on the mobile client device associated with the first user, advertisements from the advertisement buffer along with the additional communication,
wherein the advertisement placement information includes criteria to constrain selections for displaying advertisements based on one or more of a current context of the mobile client device associated with the first user, a geographic location, a demographic, an advertisement impression limit, a date, and a time.

2. The method of claim 1, wherein the received additional communication includes new advertisements.

3. The method of claim 2, further comprising:
storing the new advertisements in the advertisement buffer on the mobile client device associated with the first user; and
deleting old advertisements in the advertisement buffer, if space is needed to store the new advertisements.

4. The method of claim 1, further comprising:
generating a response to the received additional communication, and if the nearby mobile client device associated with the second user requests advertisements stored in the advertisement buffer;
selecting the stored advertisements and inserting them into the response as part of the generated response, wherein the stored advertisements are selected based on the advertisement placement information; and
determining by a processor to respond to the received additional communication with the generated response.

5. The method of claim 1, further comprising:
determining by the processor to provide an indication to the encountered access points that the mobile client device associated with the first user is ad-aware.

6. A method, comprising:
receiving advertisements on a client device associated with a first user from encountered access points, wherein the advertisements include related advertisement placement information;
storing the advertisements in an advertisement buffer on the client device associated with the first user;
receiving, at the client device associated with the first user, a communication from another client device associated with a second user;
determining by a processor to display the received communication on the client device associated with the first user;
retrieving an advertisement from the advertisement buffer on the client device associated with the first user; and
determining by the processor to display the advertisement along with the received communication on the client device associated with the first user based on advertisement placement information and a context of use of the client device associated with the first user.

7. The method of claim 6, further comprising:
storing a time and a context of use of the advertisement on the client device associated with the first user;
determining by a processor to send the time and the context of use to an information aggregating server when encountering access points that are disposed in communication with a communications network.

8. The method of claim 6, wherein the advertisement placement information includes criteria to constrain selections of advertisements to display, the criteria relating to one or more of a geographic location, a demographic, an advertisement impression limit, a profile, a date, and a time.

9. An article of manufacture comprising a tangible computer readable medium containing program code that when executed causes a mobile client device associated with a first user to at least perform:
receiving advertisements on the mobile client device associated with the first user from encountered access points, wherein the advertisements include related advertisement placement information;
storing the advertisements in an advertisement buffer on the mobile client device associated with the first user;
receiving an additional communication from a nearby mobile client device associated with a second user; and
determining to display, based on advertisement placement information on the mobile client device associated with the first user, advertisements from the advertisement buffer along with the additional communication,
wherein the advertisement placement information includes criteria to constrain selections for displaying advertisements based on one or more of a current context of the mobile client device associated with the first user, a geographic location, a demographic, an advertisement impression limit, a date, and a time.

10. The article of manufacture of claim 9, wherein the received additional communication includes new advertisements.

11. The article of manufacture of claim 10, wherein the tangible computer readable medium containing the program code that when executed causes the mobile client device associated with the first user to at least further perform:
storing the new advertisements in the advertisement buffer on the mobile client device associated with the first user; and
deleting old advertisements in the advertisement buffer, if space is needed to store the new advertisements.

12. The article of manufacture of claim 9, wherein the tangible computer readable medium containing the program code that when executed causes the mobile client device associated with the first user to at least further perform:

generating a response to the received additional communication, and if the nearby mobile client device associated with the second user requests advertisements stored in the advertisement buffer;

selecting the stored advertisements and inserting them into the response as part of the generated response, wherein the stored advertisements are selected based on the advertisement placement information; and determining to respond to the received additional communication with the generated response.

13. The article of manufacture of claim 9, wherein the tangible computer readable medium containing the program code that when executed causes the mobile client device associated with the first user to at least further perform:

determining to provide an indication to the encountered access points that the mobile client device associated with the first user is ad-aware.

14. An article of manufacture comprising a tangible computer readable medium containing program code that when executed causes a client device associated with a first user to at least perform:

receiving advertisements on the client device associated with the first user from encountered access points, wherein the advertisements include related advertisement placement information;

storing the advertisements in an advertisement buffer on the client device associated with the first user;

receiving a communication from another client device associated with a second user;

determining to display the received communication on the client device associated with the first user;

retrieving an advertisement from the advertisement buffer on the client device associated with the first user; and determining to display the advertisement along with the received communication on the client device associated with the first user based on advertisement placement information and a context of use of the client device associated with the first user.

15. The article of manufacture of claim 14, wherein the tangible computer readable medium containing the program code that when executed causes the client device associated with the first user to at least further perform:

storing a time and a context of use of the displayed advertisement on the client device associated with the first user; and determining to send the time and the context of use to an information aggregating server when encountering access points that are disposed in communication with a communications network.

16. The article of manufacture of claim 14, wherein the advertisement placement information includes criteria to constrain selections of advertisements to display, the criteria relating to one or more of a geographic location, a demographic, an advertisement impression limit, a profile, a date, and a time.

17. An apparatus, comprising:
a processor; and
a memory including computer program code, the memory and the computer program code configured to, with the processor, cause the apparatus at least to:
receive advertisements from encountered access points, wherein the advertisements include related advertisement placement information;
store the advertisements in an advertisement buffer on the apparatus;

receive an additional communication from a nearby mobile client device associated with a second user; and determine to display, based on advertisement placement information on the apparatus, advertisements from the advertisement buffer along with the additional communication, wherein the advertisement placement information includes criteria to constrain selections for displaying advertisements based on one or more of a current context of the apparatus a geographic location, a demographic, an advertisement impression limit, a date, and a time.

18. The apparatus of claim 17, wherein the received additional communication includes new advertisements.

19. The apparatus of claim 18, wherein the memory including the computer program code are further configured to, with the processor, cause the apparatus at least to:

store the new advertisements in the advertisement buffer on the apparatus; and delete old advertisements in the advertisement buffer, if space is needed to store the new advertisements.

20. The apparatus of claim 17, wherein the memory including the computer program code are further configured to, with the processor, cause the apparatus at least to:

generate a response to the received additional communication, and if the nearby mobile client device associated with the second user requests advertisements stored in the advertisement buffer;

select the stored advertisements and insert them into the response as part of the generated response, wherein the stored advertisements are selected based on the advertisement placement information; and determine to respond to the received additional communication with the generated response.

21. The apparatus of claim 17, wherein the memory including the computer program code are further configured to, with the processor, cause the apparatus at least to:

determine to provide indication to the encountered access points that the apparatus is ad-aware.

22. The apparatus of claim 20, wherein the advertisement placement information includes criteria to constrain selections of advertisements to display, the criteria relating to one or more of a geographic location, a demographic, an advertisement impression limit, a profile, a date, and a time.

23. The apparatus of claim 17, wherein the advertisements are provided in one or more of an audio, graphical, multimedia, program, textual and video format.

24. The apparatus of claim 17, wherein the encountered access points are configured to communicate via point-to-point, short-range radio-frequency communications.

25. An apparatus, comprising:
a processor; and
a memory including computer program code, the memory and the computer program code configured to, with the processor, cause the apparatus at least to:
receive advertisements from encountered access points, wherein the advertisements include related advertisement placement information;
store the advertisements in an advertisement buffer on the apparatus;
receive a communication from another client device associated with a second user;
determine to display the received communication on the apparatus;
retrieve an advertisement from the advertisement buffer on the apparatus; and determine to display the advertisement along with the received communication on the apparatus based on advertisement placement information and a context of use of the apparatus.

26. The apparatus of claim 25, wherein the memory including the computer program code are further configured to, with the processor, cause the apparatus at least to:
store a time and a context of use of the advertisement on the apparatus; and
determine to send the time and the context of use to an information aggregating server when encountering access points that are disposed in communication with a communications network.

27. The apparatus of claim 25, wherein the advertisement is determined to be displayed in a fixed ad-strip or in-line with the communication.

28. The apparatus of claim 25, wherein the advertisement placement information includes criteria to constrain selections of advertisements to display, the criteria relating to one or more of a geographic location, a demographic, an advertisement impression limit, a profile, a date, and a time.

29. The apparatus of claim 25, wherein the advertisements are provided in one or more of an audio, graphical, multimedia, program, textual and video format.

30. The apparatus of claim 25, wherein the encountered access points communicate via point-to-point, short-range radio-frequency communications.

31. A system comprising:
hardware means configured to receive advertisements on a mobile client device associated with a first user from encountered access points, wherein the advertisements include related advertisement placement information;
hardware means configured to store the advertisements in an advertisement buffer on the mobile client device associated with the first user;
hardware means configured to receive, at the mobile client device associated with the first user, an additional communication from a nearby mobile client device associated with a second user; and
hardware means configured to determine to display, based on advertising placement information on the mobile client device associated with the first user, advertisements from the advertisement buffer along with the additional communication,
wherein the advertisement placement information includes criteria to constrain selections for displaying advertisements based on one or more of a current context of the displaying mobile client device associated with the first user, a geographic location, a demographic, an advertisement impression limit, a date, and a time.

32. The system of claim 31, wherein the received additional communication includes new advertisements.

33. The system of claim 32, further comprising:
hardware means configured to store the new advertisements in the advertisement buffer on the mobile client device associated with the first user; and
hardware means configured to delete old advertisements in the advertisement buffer, if space is needed to store the new advertisements.

34. The system of claim 31, further comprising:
hardware means configured to generate a response to the received additional communication, and if the nearby mobile client device associated with the second user requests advertisements stored in device's advertisement buffer;
hardware means configured to select the stored advertisements and insert them into the response as part of the generated response, wherein the stored advertisements are selected based on the advertisement placement information; and
hardware means configured to determine to respond to the received additional communication with the generated response.

35. The system of claim 31, further comprising:
hardware means configured to determine to provide an indication to the encountered access points that the mobile client device associated with the first user is ad-aware.

36. A system comprising:
hardware means configured to receive advertisements on a client device associated with a first user from encountered access points, wherein the advertisements include related advertisement placement information;
hardware means configured to store the advertisements in an advertisement buffer on the client device associated with the first user;
hardware means configured to receive, at the client device associated with the first user, a communication from another client device associated with a second user;
hardware means configured to determine to display the received communication on the client device associated with the first user;
hardware means configured to retrieve an advertisement from the advertisement buffer on the client device associated with the first user; and
hardware means configured to determine to display the advertisement along with the received communication on the client device associated with the first user based on advertisement placement information and a context of use of the client device associated with the first user.

37. The system of claim 36, further, comprising:
hardware means configured to store a time and a context of use of the displayed advertisement on the client device associated with the first user; and
hardware means configured to determine to send the time and the context of use to an information aggregating server when encountering access points that are disposed in communication with a communications network.

38. The system of claim 36, wherein the advertisement placement information includes criteria to constrain selections of advertisements to display, the criteria relating to one or more of a geographic location, a demographic, an advertisement impression limit, a profile, a date, and a time.

* * * * *